(12) United States Patent
Kuroda et al.

(10) Patent No.: US 7,961,579 B2
(45) Date of Patent: Jun. 14, 2011

(54) INFORMATION REPRODUCTION APPARATUS

(75) Inventors: Kazuo Kuroda, Tokorozawa (JP); Naoharu Yanagawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 205 days.

(21) Appl. No.: 12/445,508

(22) PCT Filed: Oct. 17, 2006

(86) PCT No.: PCT/JP2006/320667
§ 371 (c)(1),
(2), (4) Date: Apr. 14, 2009

(87) PCT Pub. No.: WO2008/047413
PCT Pub. Date: Apr. 24, 2008

(65) Prior Publication Data
US 2010/0037247 A1    Feb. 11, 2010

(51) Int. Cl.
*G11B 7/00* (2006.01)
(52) U.S. Cl. .................. 369/53.37; 369/53.2; 369/53.45
(58) Field of Classification Search .............. 369/30.01, 369/30.03, 30.04, 30.08, 44.27, 53.2, 53.37, 369/53.45
See application file for complete search history.

(56) References Cited

U.S. PATENT DOCUMENTS

| | | | |
|---|---|---|---|
| 7,075,873 B2 * | 7/2006 | Ito | 369/53.2 |
| 7,477,582 B2 | 1/2009 | Azuma | |
| 7,602,688 B2 * | 10/2009 | Lee | 369/53.37 |
| 2006/0114778 A1 | 6/2006 | Hiranabe | |

FOREIGN PATENT DOCUMENTS

| | | |
|---|---|---|
| JP | 10-247358 | 9/1998 |
| JP | 2000-11527 | 1/2000 |
| JP | 2000-163855 | 6/2000 |
| JP | 2001-43609 | 2/2001 |
| JP | 2001-222817 | 8/2001 |
| JP | 2002-117614 | 4/2002 |
| JP | 2002-334569 | 11/2002 |
| JP | 2003-178445 | 6/2003 |
| JP | 2004-253012 | 9/2004 |

OTHER PUBLICATIONS

International Search Report for PCT/JP2006/320667, mailed Dec. 26, 2006.

* cited by examiner

*Primary Examiner* — Adam R Giesy
(74) *Attorney, Agent, or Firm* — Nixon & Vanderhye PC

(57) ABSTRACT

When a medium selection button 101 is operated, an optical disc reproduction apparatus 1 recognizes which medium is selected according to inputted medium selection information, and then opens a tray 104. Next, when a medium selection button 101 is operated, the optical disc reproduction apparatus 1 determines the inputted medium selection information and closes the tray 104. Next, the optical disc reproduction apparatus 1 acquires a priority list 16 and modifies the priority list 16 such that the order of the selected medium in the priority list 16 is a first priority and the remaining orders of the other media are successively lowered. The optical disc reproduction apparatus 1 performs a medium check for each of the media in accordance with the orders of the modified priority list 16.

3 Claims, 11 Drawing Sheets

[FIG.1]
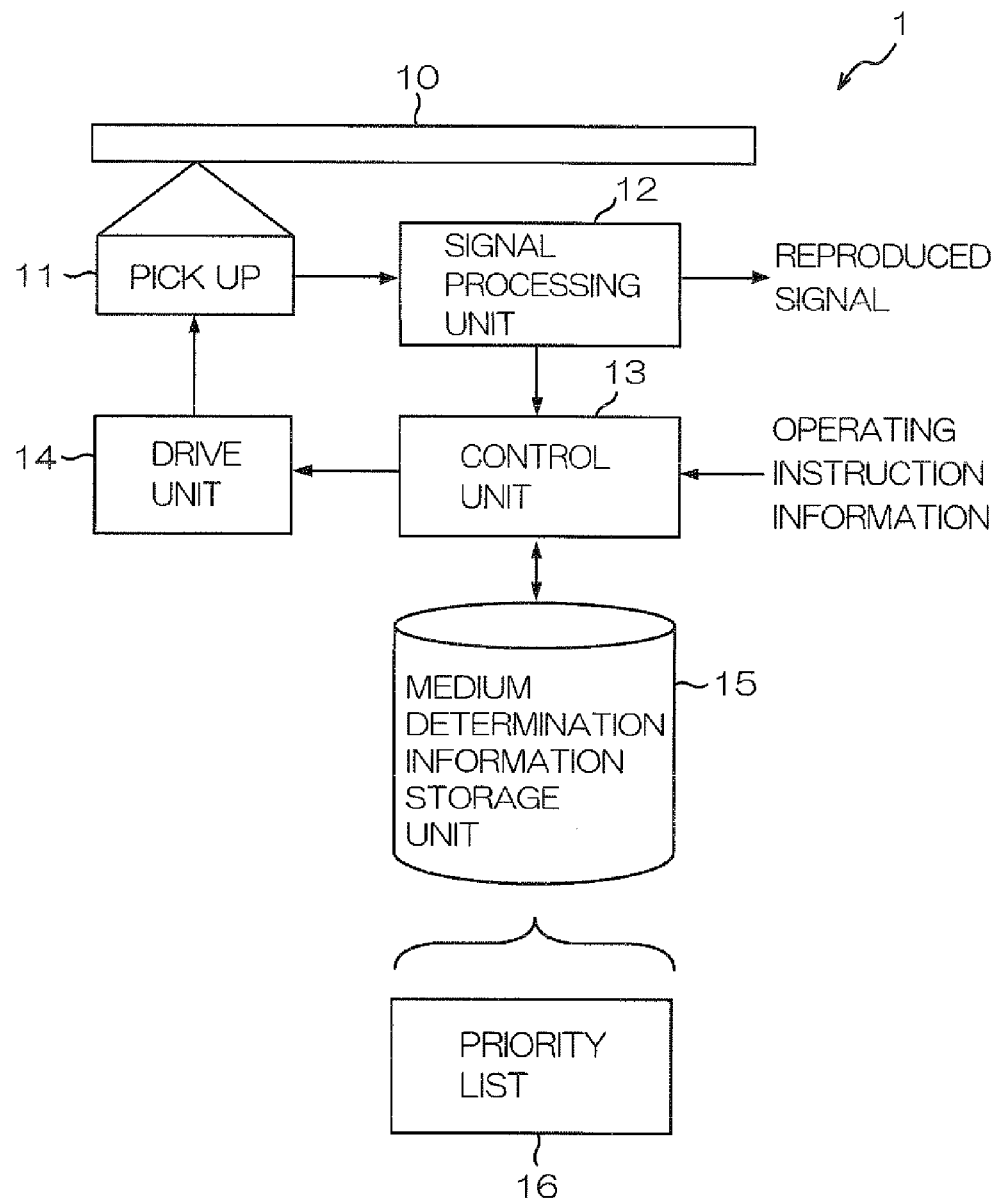

[FIG.2]
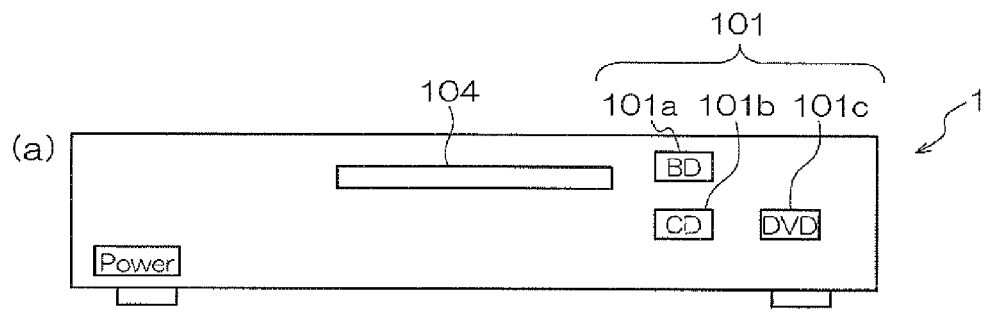
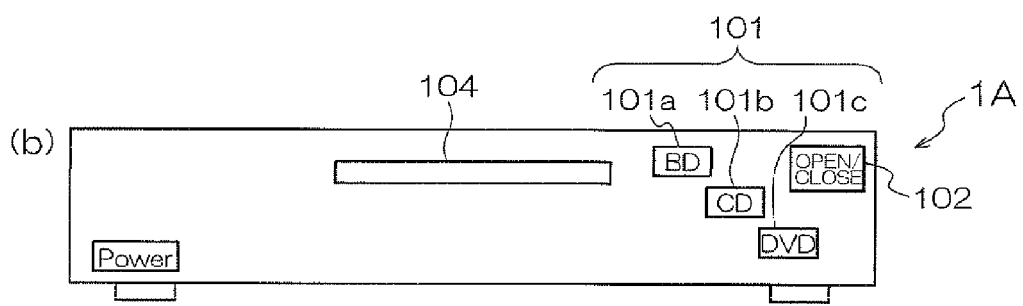
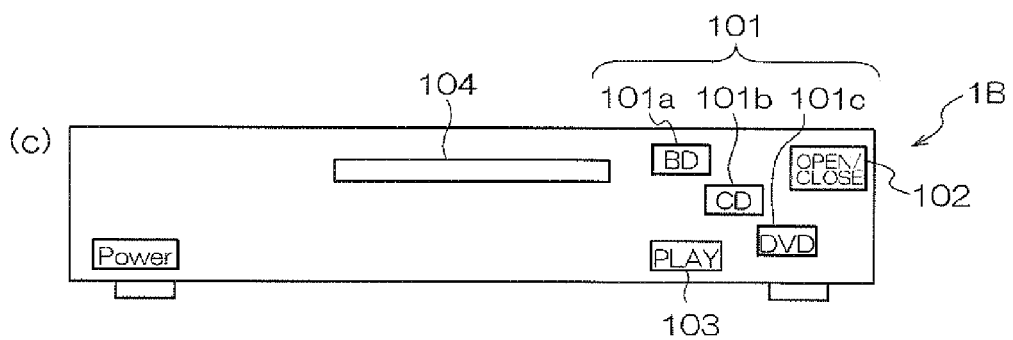

[FIG.3]
| ORDER OF PRIORITY | TYPE OF OPTICAL DISC |
|---|---|
| 1 | DVD |
| 2 | CD |
| 3 | BD |
| ⋮ | ⋮ |

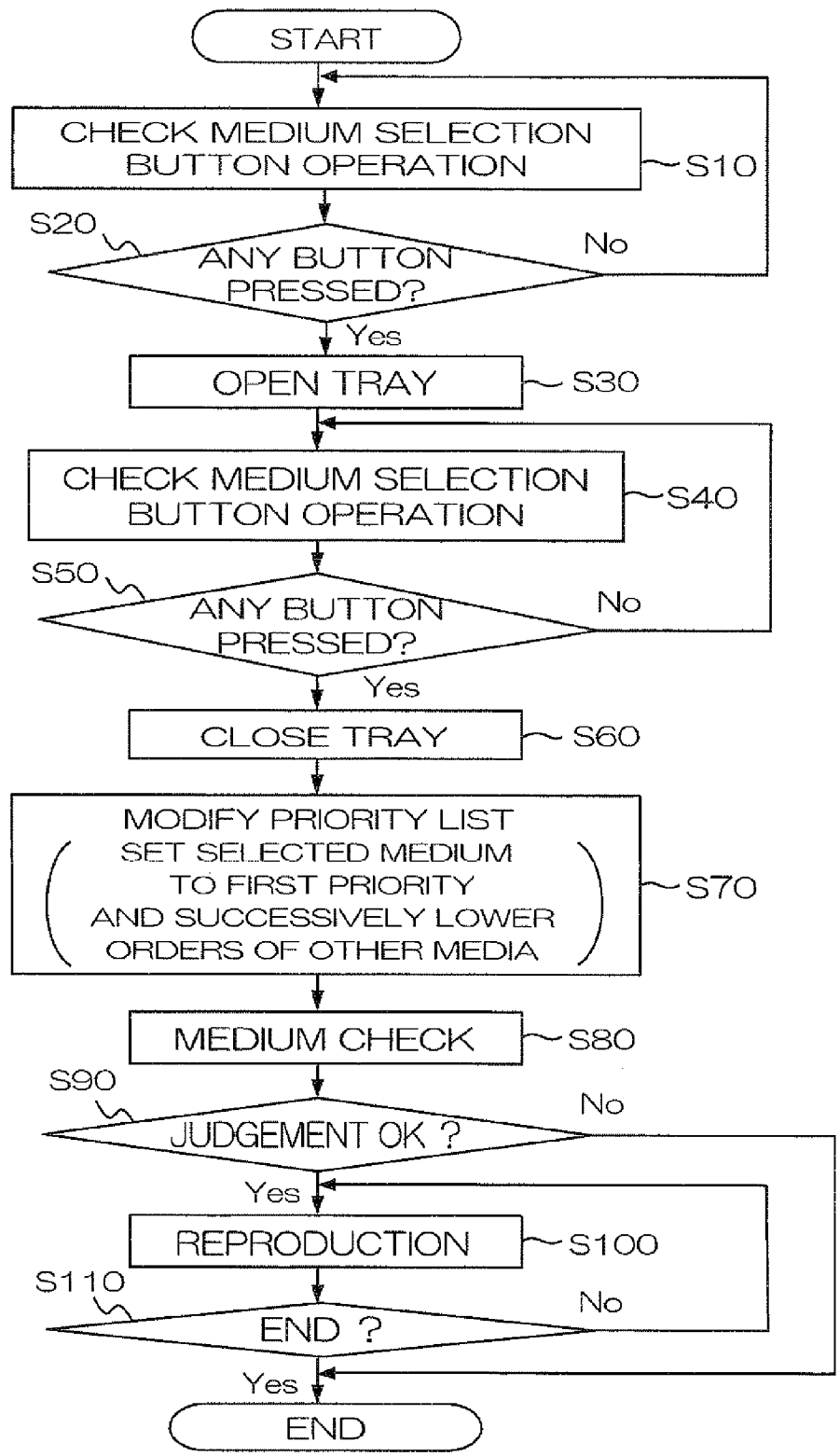
[FIG.4]

[FIG.5]
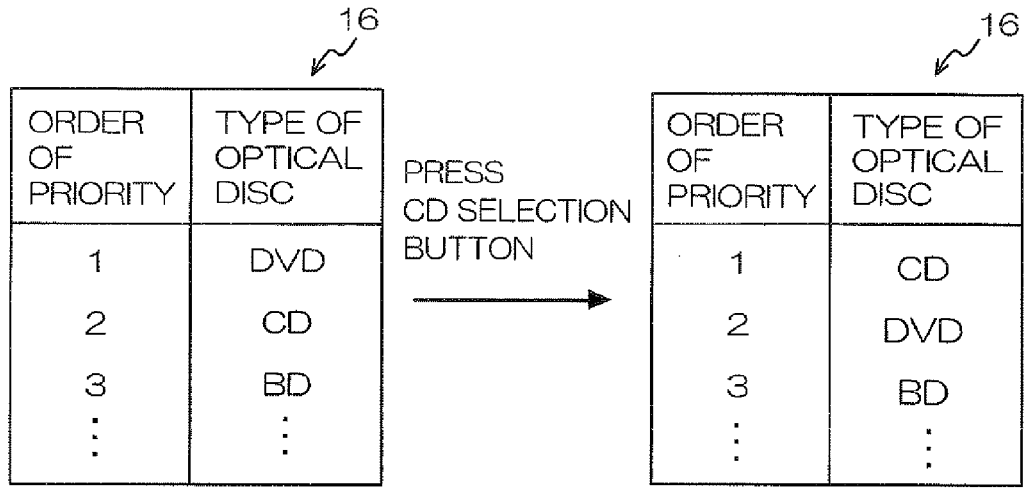
[FIG.6]
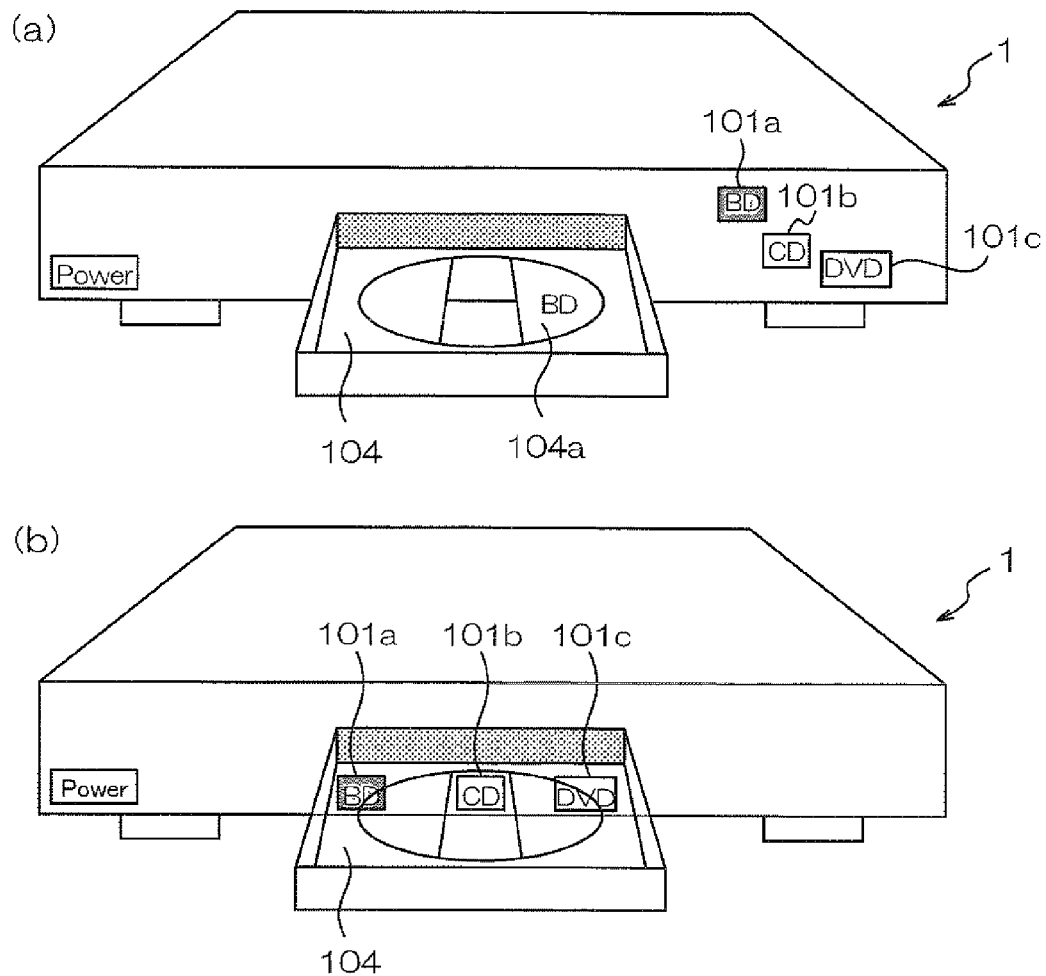

[FIG.7]

| FUNCTION | MEDIUM SELECTION BUTTON<br>(1) OPEN, SELECT MEDIUM<br>(2) CONFIRM MEDIUM, CLOSE, REPRODUCE | PLAYBACK BUTTON<br>(2) CONFIRM MEDIUM, CLOSE, REPRODUCE | OPEN AND CLOSE BUTTON<br>(1) OPEN<br>(2) CONFIRM MEDIUM, CLOSE, REPRODUCE |
|---|---|---|---|
| PATTERN A | ○ | × | × |
| PATTERN B | ○ | × | ○ |
| PATTERN C | ○ | ○ | ○ |
| PATTERN D | ○ | ○ | × |

[FIG.8]
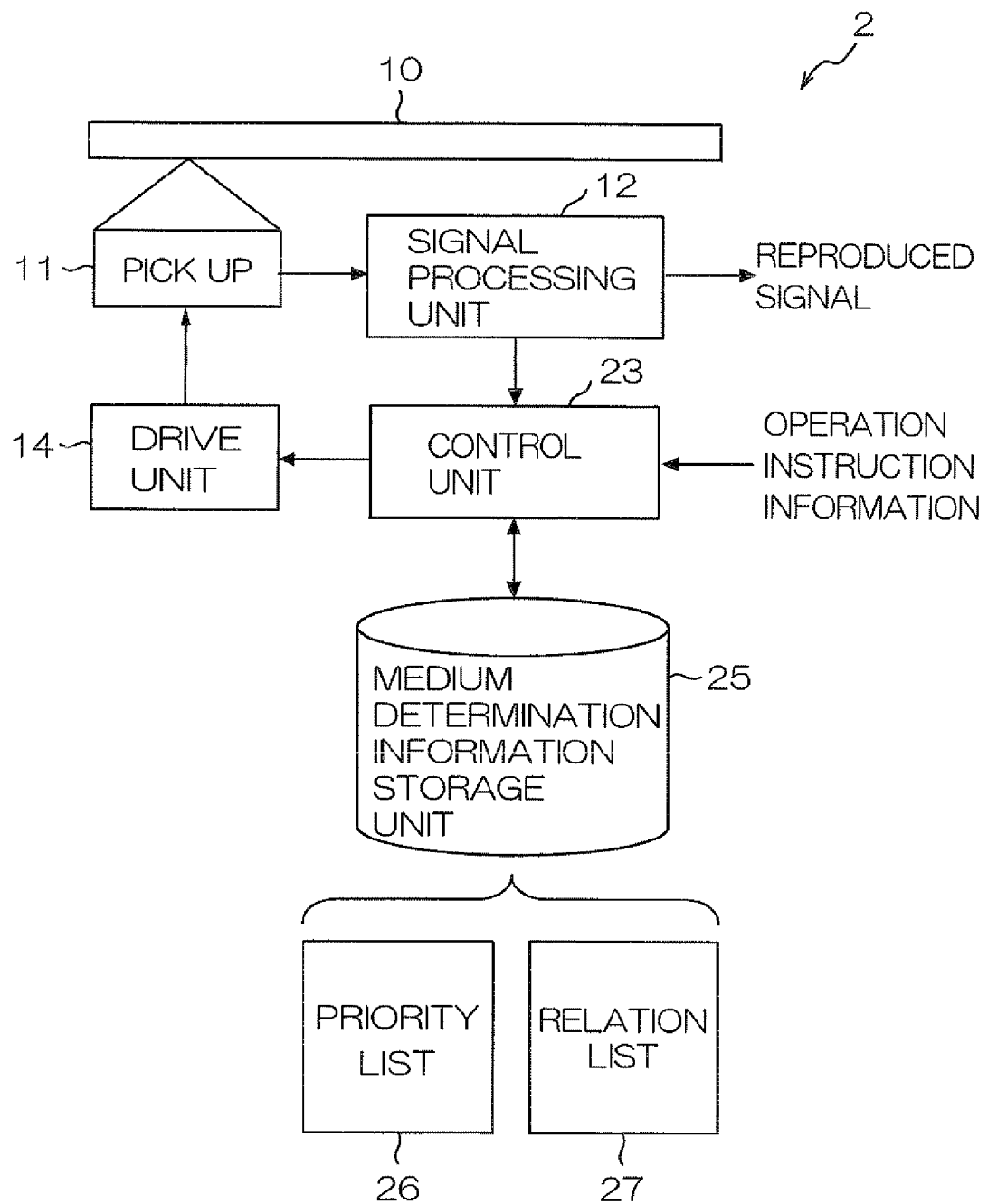

[FIG.9]
(a)
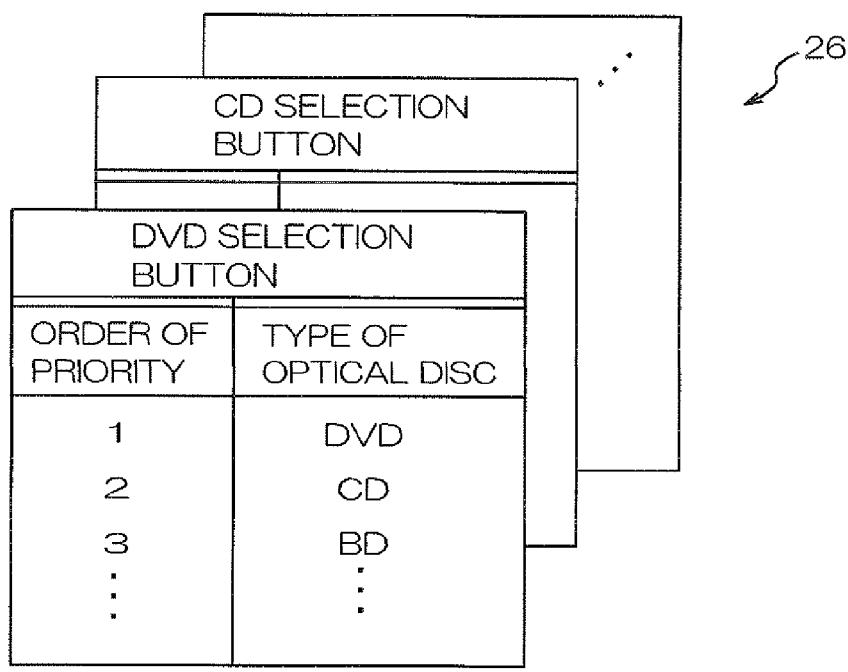
(b)
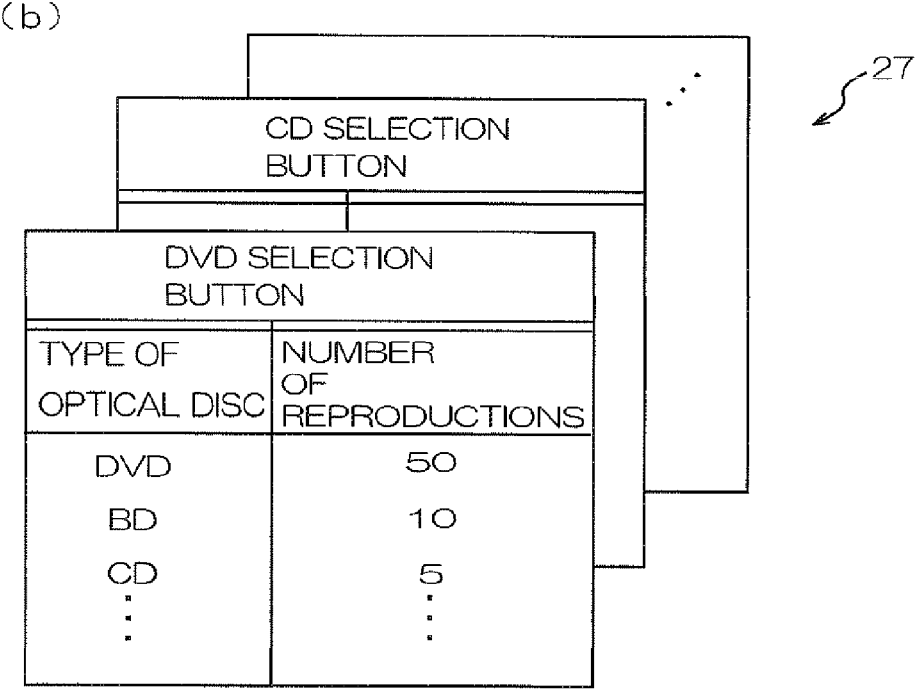

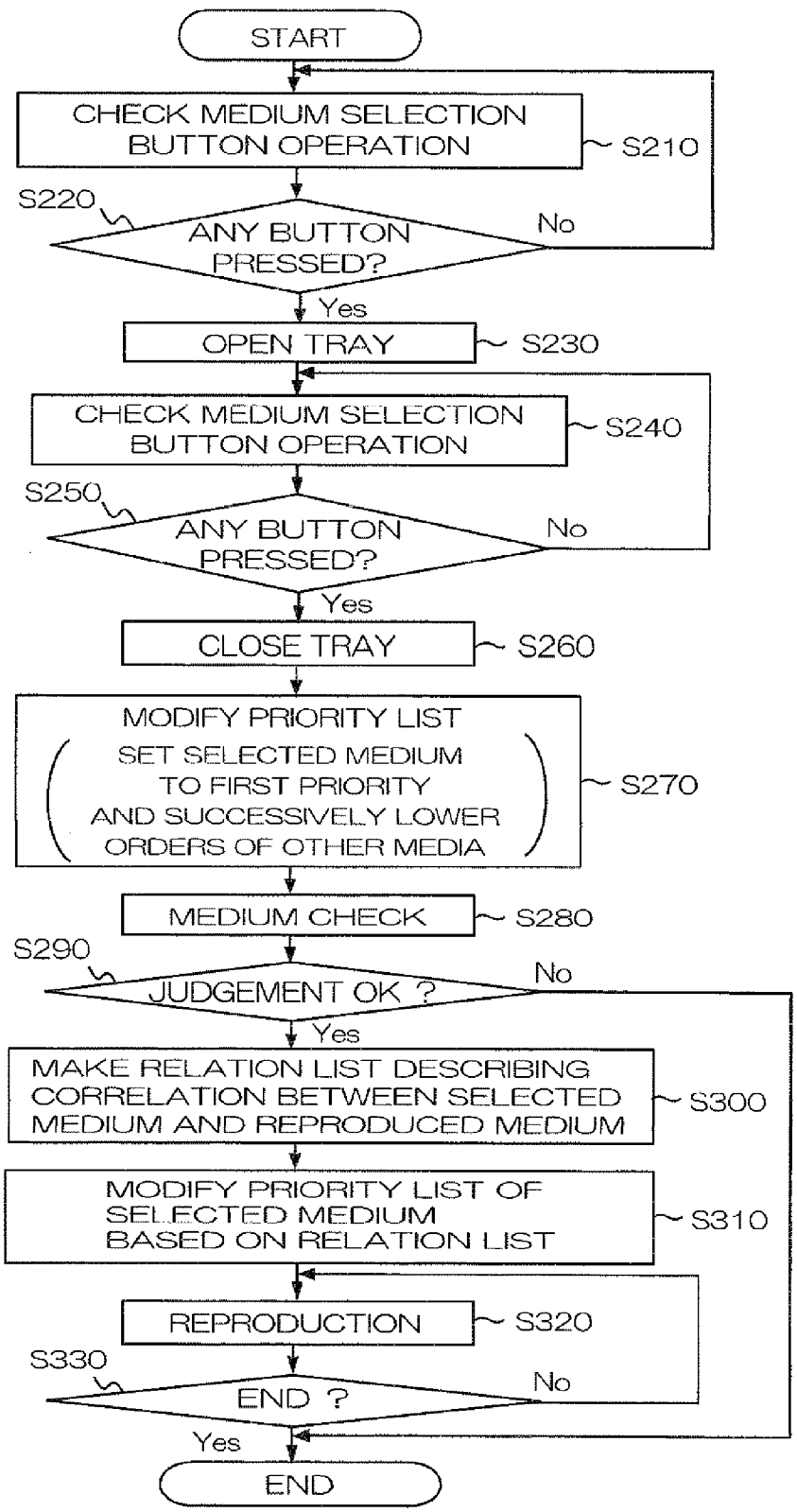
[FIG.10]

[FIG.11]
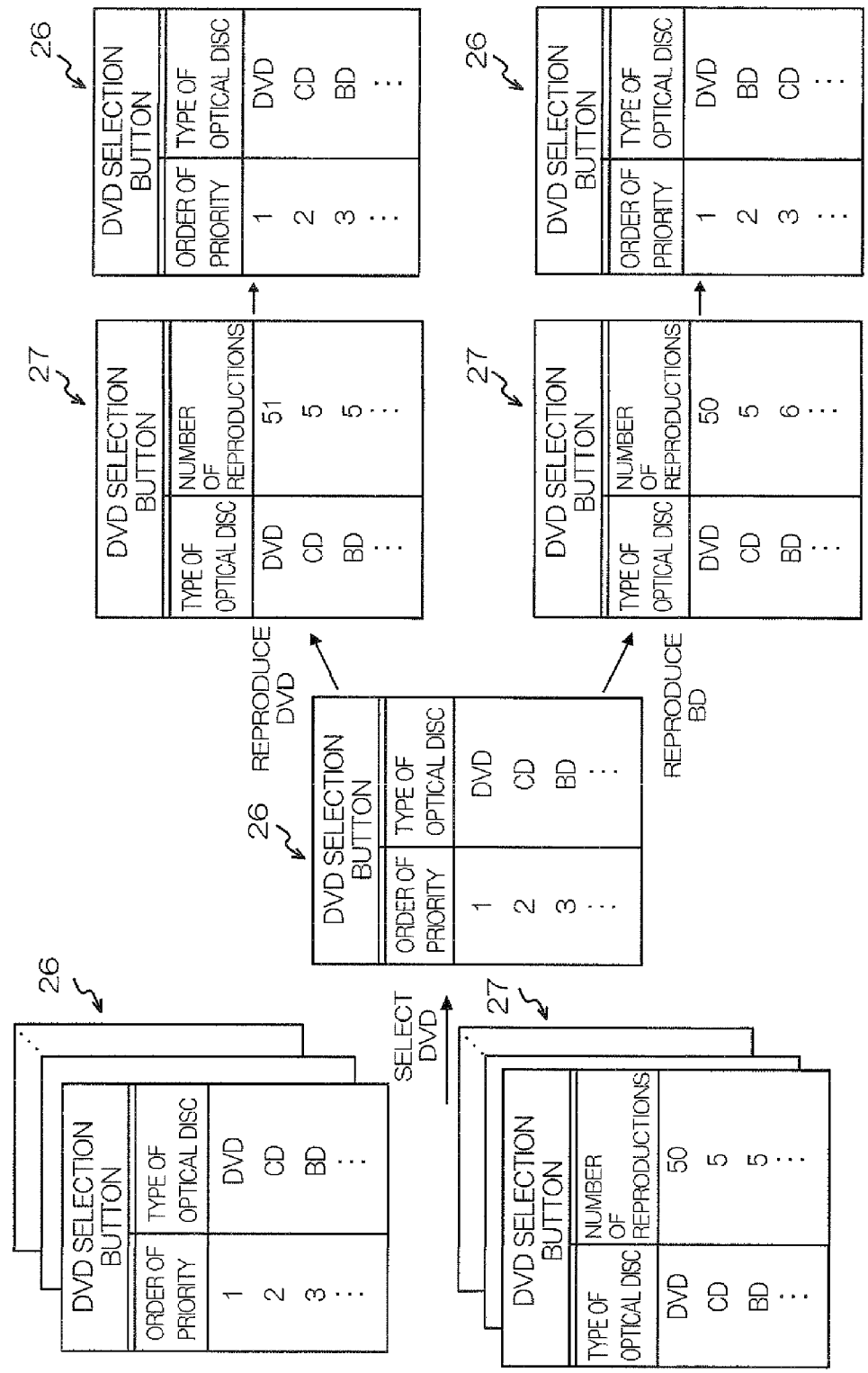

[FIG.12]
(a) 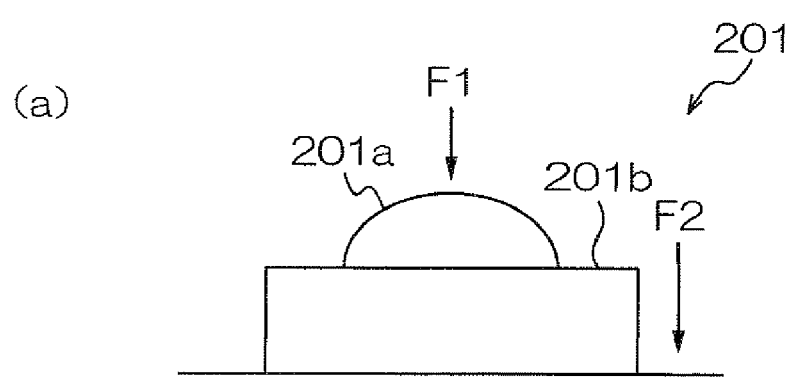
(b) 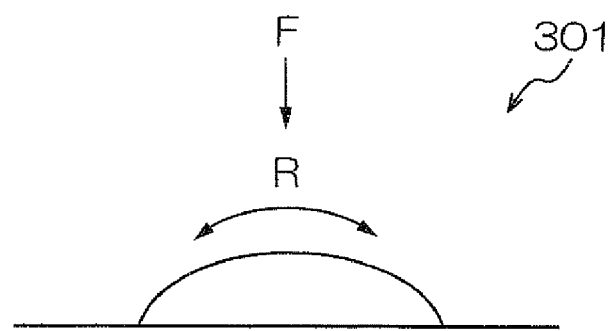

INFORMATION REPRODUCTION APPARATUS

This application is the U.S. national phase of international Application No. PCT/JP2006/320667, filed 17 Oct. 2006, which designated the U.S, the entire contents of which is hereby incorporated by reference.

TECHNICAL FIELD OF THE INVENTION

The present invention relates to information reproduction apparatuses capable of reproducing multiple types of information recording media and, in particular, to technologies for determining, in such information reproduction apparatuses, the types of information recording media each having approximately a same internal diameter.

BACKGROUND ART

There are various types of optical discs, such as CDs, VideoCDs, DVDs, BDs, and HD-DVDs, and the like, each with a same internal diameter and a same thickness.

In an optical disc reproduction apparatus for reproducing multiple types of optical discs, it is important to determine, at a high speed, the type of the optical disc that is inserted therein in order to reduce start-up time.

As a method for determining the type of the optical disc at a high speed, a method has been provided (e.g., see Patent Document 1). The method sequentially selects and loads any one of a plurality of types of optical discs in accordance with the order of user-preset priorities or the past reproduction history.

Patent Document 1: Japanese Patent Laid-Open No. 2006-155738

DISCLOSURE OF THE INVENTION

Problems to be Solved by the Invention

However, when the optical disc with the type corresponding to a low priority is inserted, it may take times to determine the type of the inserted optical disc in accordance with the order of the user-preset priorities in the above-mentioned method.

Similarly, when the optical disc with the type that has not been frequently reproduced is inserted, it may take times to determine the type of the inserted optical disc in accordance with the past reproduction history.

The present invention has been made in order to solve the above mentioned problems. An example of an object of the present invention is to provide information reproduction apparatuses, which are capable of immediately determining the type of an information recording medium.

Means for Solving the Problems

In order to achieve the object provided above, an information reproduction apparatus recited in claim 1 is an information reproduction apparatus having a tray on which an information recording medium is mountable, determining a type of an information recording medium mounted on the tray from among a plurality of types of information recording media, the plurality of types of information recording media being reproducible by the information reproduction apparatus and each having a same internal diameter, and reproducing information of the determined type of the information recording medium, the information reproduction apparatus comprising: a predetermined order of the plurality of types of information recording media to be used to determine the type of the mounted information recording medium; a medium selection information input means for inputting medium selection information indicating which type of the plurality of types of information recording media is selected; a modifying means for modifying the predetermined order such that the selected type of information recording medium through the medium selection information input means is set to a first priority in the modified order; and a medium determination means for determining the type of the mounted information recording medium in accordance with the modified order.

An information reproduction apparatus recited in claim 3 is an information reproduction apparatus having a tray on which an information recording medium is mountable, determining a type of an information recording medium mounted on the tray from among a plurality of types of information recording media, the plurality of types of information recording media being reproducible by the information reproduction apparatus and each having a same internal diameter, and reproducing information of the determined type of the information recording medium, the information reproduction apparatus comprising: a priority list storage means for storing a priority list for each of the plurality of types of information recording media, the priority list holding an order of the plurality of types of information recording media to be used to determine the type of the mounted information recording medium; a medium selection information input means for inputting medium selection information indicating which type of the plurality of types of information recording media is selected; a first priority list modifying means for: obtaining the priority list for the selected type of information recording medium through the medium selection information input means from each priority list stored in the priority list storage means; and modifying the obtained priority list such that the selected type of information recording medium through the medium selection information input means is set to a first priority in the modified priority list; a medium determination means for determining the type of the mounted recording medium in accordance with the order of the modified priority list; a relation data storage means for storing relation data in which the selected type of information recording medium is correlated with a number of reproductions of each of the plurality of types of information recording media; a second priority list modifying means for modifying the modified priority list for the selected type of information recording medium based on the relation data stored in the relation data storage means; and a modified priority list reflecting means for storing the priority list modified by the second priority list modifying means, in the priority list storage means.

BRIEF DESCRIPTION OF THE DRAWINGS

FIG. 1 is a schematic diagram of an optical disc reproduction apparatus according to a first embodiment of the present invention;

FIG. 2 is an elevation view of the optical disc reproduction apparatus according to the first embodiment of the present invention and elevation views of optical disc reproduction apparatuses according to modifications of the first embodiment of the present invention;

FIG. 3 illustrates an example of a priority list according to the first embodiment of the present invention;

FIG. 4 is a flowchart illustrating medium determination process to be executed by the optical disc reproduction apparatus according to the first embodiment of the present invention;

FIG. 5 is a view illustrating modification of the priority list according to the first embodiment of the present invention;

FIG. 6 is an outline view illustrating a selected-medium displaying function of the optical disc reproduction apparatus according to the first embodiment of the present invention;

FIG. 7 is a table illustrating: types of some buttons of a modification of the optical disc reproduction apparatus according to the first embodiment of the present invention; and a function of each of some buttons thereof;

FIG. 8 is a schematic diagram of an optical disc reproduction apparatus according to a second embodiment of the present invention;

FIG. 9 illustrates an example of a priority list and a relation list according to the second embodiment of the present invention;

FIG. 10 is a flowchart illustrating medium determination process to be executed by the optical disc reproduction apparatus according to the second embodiment of the present invention;

FIG. 11 illustrates update of each of the priority list and the relation list according to the second embodiment of the present invention; and FIG. 12 is an outline view of a modification of a medium selection button.

DESCRIPTION OF SYMBOLS

1,2 Optical disc reproduction apparatus
10 Optical disc
11 Pickup unit
12 Signal processing unit
13,23 Control unit
14 Drive unit
15,25 Medium determination information storage unit
16, 26 Priority list
27 Relation list
101,201,301 Medium selection button
102 Open and close button
103 Playback button
104 tray

BEST MODES FOR CARRYING OUT THE INVENTION

Embodiments of the present invention will be described hereinafter with reference to the drawings.

First Embodiment

FIG. 1 is a schematic diagram of an optical disc reproduction apparatus 1 according to a first embodiment of the present invention.

The optical disc reproduction apparatus 1 shown in FIG. 1 is capable of reproducing a plurality of types of optical discs 10. The optical disc reproduction apparatus 1 includes a mechanism to determine the type of the optical disc 10 inserted therein before reproducing the optical disc 10.

In the first embodiment, as an example of the plurality of types of optical discs 10, three types of optical discs will be described hereinafter; these three types include a DVD (Digital Versatile Disc), a CD (Compact Disc), and a BD (Blu-ray Disc). The present invention is however not limited to the three types of optical discs. As the plurality of types of optical discs 10, other types of optical discs except for the three types or four or more types of optical discs can be used.

A pickup unit 11 of the optical disc reproduction apparatus 1 is an optical pickup for reading a signal recorded in the optical disc 10. The pickup unit 11 delivers a laser beam to the optical disc 10, and converts a reflected light of the laser beam to an electrical signal, and outputs the electrical signal to a signal processing unit 12.

The signal processing unit 12 subjects the electrical signal to a waveform-shaping process, to a noise-removal process, and a digital-conversion process, thus outputting a reproduced signal (RF signal) to a reproducing circuit not shown and the like. The signal processing unit 12 also generates servo error signals (focus error signal and tracking error signal) from the electrical signal, and outputs the servo error signals to a control unit 13.

The control unit 13 carries out control to shift the pickup unit 11, generates a driving signal for focus control and tracking control based on the servo error signals, and outputs the driving signal to a drive unit 14. In response to receiving operating instruction information from a user, the control unit 13 performs a medium determination process that determines the type of the inserted optical disc 10.

Note that the operating instruction information from the user is medium selection information indicating that the user has selected the type of the optical disc 10. For example, the medium selection information is inputted by pressing one of a plurality of medium selection buttons 101 shown in FIG. 2(*a*). The medium determination process is a medium-checking process to be carried out by setting optical parameters (a light source, an objective lens, aberration correction, and the like) for a given medium.

Specifically, in the medium determination process, the optical disc reproduction apparatus 1 carries out: an S-curve check of the focus error signal, a focus offset check, a check of whether the RF signal is present, a data-signal correctness check, and the like to thereby determine whether the type of the inserted optical disc 10 corresponds to the type of the given medium with its optical parameters having been set. As a result of the determination, when the type of the inserted optical disc 10 does not correspond to the type of the given medium with its optical parameters having been set, the optical disc reproduction apparatus 1 sets optical parameters for another medium, and repeats the medium-checking process set forth above.

In the first embodiment, as described in detail hereinbelow, the optical disc reproduction apparatus 1 carries out the medium determination process by giving the highest priority to optical parameters to be set for a selected medium.

FIG. 2(*a*) is an elevation view of the optical disc reproduction apparatus 1 according to the first embodiment. The optical disc reproduction apparatus 1 is provided, as externally visible features, with a tray 104 and a plurality of medium selection buttons 101 (specifically, BD selection button 101*a*, CD selection button 101*b* and DVD selection button 101*c*). The operation of a medium selection button 101 means selecting the type of the optical disc 10 which should be reproduced. For example, when the user presses the BD selection button 101*a*, the user gives an instruction to the optical disc reproduction apparatus 1; this instruction indicates the BD as the medium that should be reproduced. Moreover, when the user presses the DVD selection button 101*b*, the user gives an instruction to the optical disc reproduction apparatus 1; this instruction indicates the DVD as the medium that should be reproduced.

Specifically, when the user attempts to play back an optical disc 10 with a given type, the user mounts the optical disc 10 with the given type on the tray 104. For this reason, the user recognizes the medium that should be reproduced. Therefore, the user's intention to select the medium (medium selection information) is inputted to the optical disc reproduction apparatus 1 through the medium selection button 101.

Note that, the medium selection button 101 has functions other than the medium selection, that is, a function for opening and closing the tray 104, and a function for reproduction. Specifically, a first operation of the medium selection button 101 with the tray 104 being closed means to open the tray 104 and to select the medium. A second operation of the medium selection button 101 with the tray 104 being opened means determination of the medium, close of the tray 104, and reproduction. For example, the operation of the DVD selection button 101c with the tray 104 being closed means to open the tray 104 and to select the "DVD". The operation of the DVD selection button 101c with the tray 104 being opened means determination of the selected "DVD", close of the tray 104, and reproduction of the optical disc 10.

A drive unit 14 drives an actuator, not shown, of the pickup unit 11 on the basis of the driving signal to thereby shift the pickup unit 11 in a direction orthogonal to the optical disc 10 and in radial directions thereof.

A medium determination information storage unit 15 stores a priority list 16. The control unit 13 refers the priority list when performing the medium determination process described above.

FIG. 3 shows the priority list 16 according to the first embodiment. The priority list 16 is a list holding the order of priorities of the plurality of types of the optical discs 10 for which the medium determination process is carried out; these plurality of types of the optical discs 10 are reproducible by the optical disc reproduction apparatus 1. For example, the priority list 16 shown in FIG. 3 represents that the optical disc reproduction apparatus 1 performs the medium determination processes for the CD, BD, and DVD in the following order: the medium determination process for the DVD, the medium determination process for the CD, and the medium determination process for the BD.

Note that the medium determination information storage unit 15 stores the priority list 16 in which a priority order for each type of the optical discs 10 is determined as an initial value. The priority order for each type of the optical discs 10 as the initial value has been determined based on the frequency in use of each type of the optical discs 10 at the time of shipment.

Next, the medium determination process to be executed by the optical disc reproduction apparatus 1 according to the first embodiment will be described with reference to FIG. 4. FIG. 4 is a flowchart illustrating the medium determination process to be executed by the optical disc reproduction apparatus 1.

The optical disc reproduction apparatus 1 determines whether any one of the medium selection buttons 101 is operated in step S10. When any one of the medium selection buttons 101 is operated, the optical disc reproduction apparatus 1 recognizes which medium (which type of the optical disc 10) is selected in accordance with the inputted medium selection information, and opens the tray 104 in steps S20 and S30.

Next, the optical disc reproduction apparatus 1 in which the optical disc 10 is inserted determines whether any one of the medium selection buttons 101 is operated in step S40. When any one of the medium selection button 101 is operated, the optical disc reproduction apparatus 1 recognizes that the inputted medium selection information is fixed, and closes the tray 104 in steps S50 and S60.

Subsequently, the optical disc reproduction apparatus 1 acquires the priority list 16, and modifies the content of the priority list 16 in step S70. The modification means to set the selected medium to the highest order (first priority), and successively lower priorities of the remaining media. For example, when the CD is selected, the optical disc reproduction apparatus 1 having the priority list 16 shown in FIG. 5 modifies the priority list 16 so as to set the CD to first priority, the DVD to second priority, and the BD to third priority.

Next, the optical disc reproduction apparatus 1 performs the medium check for each of the media in the order of the priorities of the modified priority list 16 in step S80. When it is determined that the inserted optical disc 10 corresponds to one of the media described in the modified priority list 16, the optical disc reproduction apparatus 1 reproduces the inserted optical disk 10 until receiving an instruction of stopping playback in steps S90 to S110. Otherwise, when it is determined that the inserted optical disc 10 does not correspond to any medium described in the priority list 16, the optical disc reproduction apparatus 1 terminates the medium determination process in step S90.

Note that, in the first embodiment, even if one of the medium selection buttons 101 operated first with the tray 104 being closed is different from another one of the medium selection buttons 101 operated after the optical disc 10 has been inserted with the tray 104 being opened, the optical disc reproduction apparatus 1 permits close of the tray 104 and reproduction. That is, the optical disc reproduction apparatus 1 selects the medium indicated by any one of the medium selection buttons 101 operated first, but the present invention is not limited to the structure. Specifically, the optical disc reproduction apparatus 1 can select the medium indicated by any one of the medium selection buttons 110 operated after any one of the medium selection buttons 101 has been operated first. In this case, even if the user selects a wrong medium at first, the user can select a desired medium again.

In the first embodiment, the optical disc reproduction apparatus 1 only refers to the priority list 16 which is modified in step S70 so that the medium determination information storage unit 15 is not updated. Specifically, the priority list 16 acquired at each time of execution of the medium determination process according to the first embodiment has the same content (the initial content). Alternatively, the optical disc reproduction apparatus 1 can store the modified priority list 16 in step S70 in the medium determination information storage unit 15. This makes it possible to reflect medium-selection histories in the content of the priority list 16.

As described above, the optical disc reproduction apparatus 1 according to the first embodiment modifies the priority list 16 storing therein the order of priorities of the plurality of types of the optical discs 10 such that the user-selected medium is set to the highest priority. In accordance with this modified priority list 16, the optical disc reproduction apparatus 1 determines the type of the inserted optical disc 10. Thus, the optical disc reproduction apparatus 1 can quickly determine the type of the inserted optical disc 10. Specifically, when the medium recognized, by the user, to be reproduced corresponds to the actually inserted medium, the optical disc reproduction apparatus 1 determines the type of the medium by the first medium determination process, making it possible to reduce start-up time.

Each of the medium selection buttons 101 also has a medium-selection indicating function of being lightened or flashed upon being pressed down as shown in FIG. 6(a). Therefore, the user can visually confirm the medium selected by the user. Moreover, on a disc mounting surface of the tray 104, a display 104a is provided. For example, the display 104a consists of an organic EL device. This makes it possible to prevent the user from inserting a wrong medium, when the user inserts an optical disc 10.

The arrangement of the medium selection buttons 101 is not limited to the arrangement illustrated in FIG. 6(a). The medium selection buttons 101 can be arranged to be lower than the tray 104 illustrated in FIG. 6(b). In this case, the tray 104 is formed with a transparent disc mounting surface. For this reason, the user can confirm the lighting medium selection button 101 through the transparent disc mounting surface when inserting the optical disc 10.

Distances between the medium selection buttons 101 may be varied. Specifically, the distance between one pair of the medium selection buttons 101 may be longer than that between another pair of the medium selection buttons 101; a user is likely to mistake selecting one of the one pair of the medium selection buttons 101 for selecting the other of the one pair thereof. For example, if it was estimated that the user frequently mistook the selection of the CD for that of the BD, the distance between the BD selection button 101a and the DVD selection button 101c would be longer than: the distance between the BD selection button 101a and the CD selection button 1011b; and the distance between the CD selection button 101b and the DVD selection button 101c, as shown in FIG. 2(a). This arrangement prevents the user from wrongly operating the medium selection button 101 that the user does not want to press.

Moreover, in the first embodiment, the user gives the instructions of selection of a medium, confirmation of the medium, opening and closing of the tray 104, and reproduction to the optical disc reproduction apparatus 1 by using only the medium selection buttons 101. However, the present invention is not limited to the structure. Specifically, the user may give each of the instructions to the optical disc reproduction apparatus 1 by using other operation buttons (a tray open and close button and a playback button) in addition to the medium selection buttons 101.

FIG. 7 illustrates at least one function of each of the buttons that are the combinations of the medium selection buttons 101 and the other operation buttons (tray open and close button and playback button). FIG. 7 also illustrates the patterns of combinations of the medium selection buttons 101, the tray open and close button, and the playback button. Note that reference numeral (1) in each of some function columns in the table shown in FIG. 7 indicates the function of a corresponding one button with the tray 104 being closed. Reference numeral (2) in each of the function columns in the table shown in FIG. 7 indicates the function of a corresponding one button with the tray 104 being opened. In addition, each reference mark "○" indicates existence of a corresponding one button, and each reference mark "x" indicates nonexistence of a corresponding one button.

Pattern A expresses the medium selection buttons 101 according to the first embodiment. Pattern B expresses the combinations of the medium selection buttons 101 and the tray open and close button 102 as shown in FIG. 2(b). Pattern C expresses the combinations of the medium selection buttons 101, the tray open and close button 102, and the play back button 103 as shown in FIG. 2(c). Pattern D expresses the combinations of the medium selection buttons 101 and the play back button 103.

For example, in the case of the pattern B, the user's operation of the medium selection button 101 with the tray 104 being closed allows open of the tray 104 and selection of the medium. In addition, the user's operation of the open and close button 102 with the tray 104 being opened and the optical disc 10 being mounted on the tray 104 allows confirmation of the selected medium, close of the tray 104, and reproduction. Of course, even in the case of the pattern B, the user can operate only the medium selection buttons 101 like the first embodiment to thereby operate the optical disc reproduction apparatus 1 (see FIG. 7).

In the case of the pattern B, the optical disc reproduction apparatus 1 is designed to check whether the open and close button 102 in addition to the medium selection buttons 101 are operated in steps S10 and 540 of the medium determination process shown in FIG. 4. Additionally, when the pattern B is used, it is possible to reproduce the optical disc 10 without the operation of the medium selection buttons 101. In this case of the pattern B, the optical disc reproduction apparatus 1 performs, in step S80, the medium check for each of the media in the order of the priorities of the original priority list 16, that is, in the order of the priorities of the priority list 16 unmodified in step S70.

The medium selection buttons 101 shown in FIG. 7 has the tray opening and closing function and the medium reproducing function other than the medium selecting function, but it can have only the medium selecting function.

Second Embodiment

FIG. 8 is a schematic diagram of an optical disc reproduction apparatus 2 according to a second embodiment of the present invention. Components of the optical disc reproduction apparatus 2 shown in FIG. 8 are substantially identical to those of the optical disc reproduction apparatus 1, but the information stored in a medium determination information storage unit 25 is different from that stored in the medium determination information storage unit 15. For this reason, a medium determination process according to the second embodiment is different from that according to the first embodiment.

In the second embodiment, as an example of the plurality of types of optical discs 10, three types of optical discs will be described hereinafter; these three types include a DVD (Digital Versatile Disc), a CD (Compact Disc), and a BD (Blu-ray Disc). In addition, the structure and functions of the optical disc reproduction apparatus 2 according to the second embodiment are substantially identical to those of the optical disc reproduction apparatus 1 except for the following different points described hereinafter. So, like parts between the optical disc reproduction apparatuses 1 and 2 according to the first and second embodiments, to which like reference characters are assigned, are omitted in description.

The control unit 23 carries out control to shift the pickup unit 11, and generates a driving signal for a focus control and tracking control based on the servo error signals, and outputs the driving signal to the drive unit 14. In response to receiving operating instruction information from a user, the control unit 23 performs a medium determination process that determines the type of the inserted optical disc 10.

Note that, in the second embodiment, as described in the first embodiment, the operating instruction information is inputted through the plurality of medium selection buttons 101 shown in FIG. 2(a).

A medium determination information storage unit 25 stores a priority list 26 and a relation list 27. The control unit 23 refers the priority list 26 and the relation list 27 when performing the medium determination process.

FIG. 9(a) shows the priority list 26 according to the second embodiment. The priority list 26 is a list for each medium selection button 101 (selected medium). The priority list 26 for each medium selection button 101 holds the order of priorities of the plurality of types of the optical discs 10 for which the medium determination process is carried out; these plurality of types of the optical discs 10 are reproducible by the optical disc reproduction apparatus 2. For example, the priority list 26 for the DVD selection button 101*c*, shown in FIG. 9(*a*), is the priority list to which the control unit 23 refers when the user selects the DVD. Specifically, the priority list 26 for the DVD selection button 101*c* represents that the optical disc reproduction apparatus 2 performs the medium determination processes for the CD, BD, and DVD in the following order: the medium determination process for the DVD, the medium determination process for the CD, and the medium determination process for the BD.

FIG. 9(*b*) shows the relation list 27 according to the second embodiment. The relation list 27 for each medium selection button 101 is a historical list holding the correlation between each medium to be selected and a corresponding reproduced medium. Specifically, the relation list 27 for each medium selection button 101 (selected medium) has information indicative of the number of reproductions of each medium. For example, the relation list 27 for the DVD selection button, shown in FIG. 9(*b*), is the relation list to which the control unit 23 refers when the user selects the DVD. Specifically, the relation list 27 for the DVD selection button represents that the number of reproductions of DVD by the optical disc reproduction apparatus 2 is 50 times, the number of reproductions of BD 10 times, and the number of reproductions of CD 5 times. Ten times of BD mean the number of times the user has erroneously mounted a BD, and five times of CD mean the number of times the user has erroneously mounted a CD.

As described later, the relation list 27 for each medium selection button is used when the priority list 26 is modified and the modified priority list 26 based on the relation list 27 is stored in the medium determination information storage unit 25. In other words, the optical disc reproduction apparatus 2 updates the content of the priority list 26 while adding the statistical information of the user's wrong operations of a medium selection button 101.

Note that the medium determination information storage unit 25 stores the priority list 26 for each medium selection button 101 in which a priority order for each medium is determined as an initial value. The priority order for each medium as the initial value has been determined based on the frequency in use of each medium at the time of shipment. In the priority list 26 for each medium selection button 101, the highest priority is of course set to one medium to be selected by a corresponding medium selection button 101.

Next, the medium determination process to be executed by the optical disc reproduction apparatus 2 according to the second embodiment will be described with reference to FIG. 10. FIG. 10 is a flowchart illustrating the medium determination process to be executed by the optical disc reproduction apparatus 2.

The optical disc reproduction apparatus 2 determines whether any one of the medium selection buttons 101 is operated in step S210. When any one of the medium selection buttons 101 is operated, the optical disc reproduction apparatus 2 recognizes which medium (which type of the optical disc 10) is selected in accordance with the inputted medium selection information, and opens the tray 104 in steps S220 and S230.

Next, the optical disc reproduction apparatus 2 in which the optical disc 10 is inserted determines whether any one of the medium selection button 101 is operated in step S240. When any one of the medium selection button 101 is operated, the optical disc reproduction apparatus 2 recognizes that the inputted medium selection information is fixed, and closes the tray 104 in steps S250 and S260.

Subsequently, the optical disc reproduction apparatus 2 acquires the priority list 26, and modifies the content of the priority list 26 in step S270. The modification means to set the selected medium to the highest order (first priority), and successively lower the priorities of the remaining media. For example, when the DVD is selected, the optical disc reproduction apparatus 2 having the priority list 26 shown in FIG. 11 obtains the priority list 26 for the DVD selection button. Then, the optical disc reproduction apparatus 2 modifies the obtained priority list 26 so as to set the DVD to the first priority, the CD to the second priority, and the BD to the third priority. In this case, the order of the priority list 26 for the DVD selection button is not varied.

Next, the optical disc reproduction apparatus 2 performs the medium check for each of the media in the order of the priorities of the modified priority list 26 in step S280. When it is determined that the inserted optical disc 10 corresponds to one of the media described in the modified priority list 26, the optical disc reproduction apparatus 2 acquires the relation list 27 for the selected medium, and increments the number of reproductions of the determined medium to thereby update the relation list 27 for the selected medium in steps S290 and S300. For example, when the DVD is selected to be determined, that is, the DVD is reproduced, the optical disc reproduction apparatus 2 having the relation list 27 shown in FIG. 11 updates the number of reproductions of DVD from 50 to 51. Similarly, when the DVD is selected but the BD is confirmed, that is, when the BD is reproduced, the optical disc reproduction apparatus 2 updates the number of reproductions of BD from 5 to 6.

Next, the optical disc reproduction apparatus 2 modifies the priority list 26 based on the updated relation list 27 in step S310. Specifically, the optical reproduction apparatus 2 modifies the order of priorities of the media except for the medium of the first priority in the priority list 26 in the descending order of the number of reproductions of media except for the medium of the first priority in step S310. Then, the optical reproduction apparatus 2 stores the modified priority list 26 in the medium determination information storage unit 25 in step S310. For example, when the relation list 27 for the DVD selection button represents that the number of reproductions of DVD is 50, the number of reproductions of CD is 5, and the number of reproductions of BD is 6, the optical disc reproduction apparatus 2 modifies the priority list 26 for the DVD selection button so as to update the BD from the third priority to the second priority, and the CD from the second priority to the third priority.

Next, the optical disc reproduction apparatus 2 reproduces the medium until receiving an instruction of stopping playback in steps S320 and S330. Otherwise, when it is determined that the inserted optical disc does not correspond to any medium described in the priority list 26 in S290, the optical disc reproduction apparatus 2 terminates the medium determination process.

As described above, the optical disc reproduction apparatus 2 according to the second embodiment modifies a priority list 26 storing therein the order of priorities of the plurality of types of the optical discs 10 for a corresponding one medium selection button 101 such that the user-selected medium is set to the highest priority. In accordance with this modified priority list 26, the optical disc reproduction apparatus 2 determines the type of the inserted optical disc 10. Thus, the optical disc reproduction apparatus 2 can quickly determine the type of the inserted optical disc 10. Specifically, when the medium recognized, by the user, to be reproduced corresponds to the actually inserted medium, the optical disc reproduction apparatus 2 determines the type of the medium by the first medium determination process, making it possible to reduce start-up time.

In addition, the optical disc reproduction apparatus 2 has a relation list 27 involving the statistical information related to the user's wrong selections for a corresponding medium selection button. Thus, even if the user erroneously selects a medium, that is, even if the user-recognized medium to be reproduced is different from the actually inserted medium, the optical disc reproduction apparatus 2 determines the type of the inserted optical disc 10 in accordance with the priority list 26 in which the content of the corresponding relation list 27 is reflected. This makes it possible for the optical disc reproduction apparatus 2 to immediately determine the type of the inserted optical disc 10. Specifically, upon determining that, based on the statistical information, an inserted medium is a medium that is erroneously selected by the user at many times, the optical disc reproduction apparatus 2 sets a higher priority to the medium, and thereafter, performs the medium determination process. Thus, it is possible to reduce start-up time.

Other Embodiments

Various modifications and changes can be made in the embodiment described above within a scope of not departing from the spirit of the present invention.

Each of the optical disc reproduction apparatuses according to the first and the second embodiments has the plurality of medium selection buttons 101 for selecting one from among the plurality of media, but, the mechanism of selecting one from among the plurality of media is not limited to the plurality of medium selection buttons 101.

For example, the plurality of media may be selected by a single medium selection button. FIG. 12(a) illustrates a cross-sectional view of a single medium selection button 201 as an example, and FIG. 12(b) illustrates a cross-sectional view of a single medium selection button 301 as another example.

The medium selection button 201 shown in FIG. 12(a) has a two-step configuration. In the medium selection button 201, at first, weak force F1 actuates the switch of the first step button to thereby select any one of the plurality of media. Next, strong force F2 actuates the switch of the second step button to thereby determine the selected medium. The medium selection button 301 shown in FIG. 12(b) is designed as a jog dial. In the medium selection button 301, at first, rotation of the button 301 in the direction of R selects any one of the plurality of media. Next, press of the button 301 in the direction of F determines the selected medium.

The number of the plurality of selectable media may not match that of the medium selection buttons. For example, the optical disc reproduction apparatus may have the BD selection button and a CD/DVD selection button that serves as both the CD selection button and the DVD selection button.

In each of the embodiments described above, the optical disc reproduction apparatus itself is provided with the medium selection buttons 101 or the medium selection button 201 or 301. But alternatively or additionally, a remote controller may have the medium selection buttons 101 or the medium selection button 201 or 301.

In each of the embodiments described above, the optical disc reproduction apparatus has the priority list, and modifies the priority list to thereby determine the order of the medium determination processes to be executed for the plurality of media. However, the priority list and the modification of the priority list are not indispensable. Specifically, logic (a program) previously installed in the optical disc reproduction apparatus may determine the order of the medium determination processes to be executed for the plurality of media, whereby the optical disc reproduction apparatus may not store data indicative of the order of the medium determination processes to be executed for the plurality of media.

For example, it is assumed that the order of the medium determination processes to be executed for the plurality of media is predetermined in the following order: the first for "CD", the second for "VideoCD", the third for "SACD", the fourth for "DVD", the fifth for "BD", and the sixth for "HD DVD".

In this assumption, when the user selects the DVD selection button, the program may carry out, as a routine of determination, the medium determination processes in the following order: the first for "DVD", the second for "BD", the third for "HD-DVD", the fourth for "CD", the fifth for "VideoCD", and the sixth for "SACD". The program may carry out, as another routine of determination, the medium determination processes in the following order: the first for "DVD", the second for "CD", the third for "VideoCD", the fourth for "SACD", the fifth for "BD", and the sixth for "HD-DVD".

The invention claimed is:

1. An information reproduction apparatus having a tray on which an information recording medium is mountable, determining a type of an information recording medium mounted on the tray from among a plurality of types of information recording media, the plurality of types of information recording media being reproducible by the information reproduction apparatus and each having a same internal diameter, and reproducing information of the determined type of the information recording medium, the information reproduction apparatus comprising:

a priority list storage means for storing a priority list for each of the plurality of types of information recording media, the priority list holding an order of the plurality of types of information recording media to be used to determine the type of the mounted information recording medium;

a medium selection information input means for inputting medium selection information indicating which type of the plurality of types of information recording media is selected;

a first priority list modifying means for:

obtaining the priority list for the selected type of information recording medium through the medium selection information input means from each priority list stored in the priority list storage means; and modifying the obtained priority list such that the selected type of information recording medium through the medium selection information input means is set to a first priority in the modified priority list;

a medium determination means for determining the type of the mounted recording medium in accordance with the order of the modified priority list;

a relation data storage means for storing relation data in which each type of some media that have been reproduced by the information reproducing apparatus in the plurality of types of information recording media is correlated with a number of reproductions of a corresponding type of some media that have been reproduced thereby for each of the plurality of types of information recording media selectable by the medium selection information input means;

a relation data update means for updating the number of reproductions included in the relation data, the number of reproductions corresponding to the selected type of information recording medium and the type of reproduced information recording medium, and for storing the relation data with the updated number of reproductions in the relation data storage means;

a second priority list modifying means for modifying the priority list for the type of the selected information recording medium, based on the relation data stored in the relation data storage means; and a modified priority list reflecting means for storing the priority list modified by the second priority list modifying means, in the priority list storage means.

2. The information reproduction apparatus according to claim 1, further comprising:

a plurality of medium selection buttons corresponding to the plurality of types of the information recording media, respectively, wherein the medium selection information input means inputs the medium selection information corresponding to one operated button in the plurality of medium selection buttons.

3. The information reproduction apparatus according to claim 2, further comprising:

a medium selection display means for displaying the selected type of information recording medium through the medium selection information input means, the medium selection display means being disposed on any one of a front surface of the information reproduction apparatus and the tray.

* * * * *